United States Patent [19]

Castens

[11] Patent Number: 5,211,273
[45] Date of Patent: May 18, 1993

[54] AXIAL THRUST CLUTCH/BEARING/FREEWHEEL

[75] Inventor: Rudolf R. Castens, Leiden, Netherlands

[73] Assignee: Hybo Science, Inc., Delray Beach, Fla.

[21] Appl. No.: 906,752

[22] Filed: Jun. 30, 1992

Related U.S. Application Data

[63] Continuation of Ser. No. 7,762,585, Sep. 19, 1991, abandoned, which is a continuation-in-part of Ser. No. 7,418,795, Oct. 3, 1989, Pat. No. 5,067,601, which is a continuation of Ser. No. 7,112,638, Oct. 22, 1987, abandoned, which is a continuation-in-part of Ser. No. 7,016,458, Feb. 18, 1987, abandoned, which is a continuation-in-part of Ser. No. 8,821,453, Jan. 22, 1986, abandoned.

[51] Int. Cl.⁵ .................... F16D 41/06; F16D 43/20
[52] U.S. Cl. ........................................ 192/45; 192/54
[58] Field of Search ................. 192/45, 54, 65, 93 A

[56] References Cited

U.S. PATENT DOCUMENTS

| | | |
|---|---|---|
| Re. 17,489 | 11/1929 | Anderson . |
| Re. 18,789 | 4/1933 | Gahagan . |
| Re. 32,346 | 2/1987 | Klamer et al. ............... 280/11.2 |
| 533,912 | 2/1895 | Moise . |
| 1,047,551 | 12/1912 | Myers . |
| 1,190,714 | 7/1916 | Bottome . |
| 1,376,033 | 4/1921 | Page . |
| 1,423,666 | 7/1922 | Langhaar . |
| 1,555,939 | 10/1925 | Brisbois . |
| 1,736,837 | 11/1929 | Reich . |
| 1,878,556 | 9/1932 | Vincent . |
| 1,901,714 | 3/1933 | Vincent . |
| 1,929,782 | 10/1933 | Hughes . |
| 1,955,879 | 4/1934 | Griswold . |
| 2,009,964 | 7/1935 | Mottlau ........................ 192/45 |
| 2,064,230 | 12/1936 | Starr . |
| 2,187,471 | 1/1940 | Hutchinson . |
| 2,211,548 | 8/1940 | Schwinn ....................... 192/64 |
| 2,323,753 | 7/1943 | Jaeger et al. . |
| 2,345,972 | 4/1944 | Hardy .......................... 192/50 |
| 2,451,621 | 10/1948 | Houston . |
| 2,493,418 | 1/1950 | Orshansky, Jr. . |
| 2,547,453 | 4/1951 | Egy . |
| 2,633,951 | 4/1953 | Ayer et al. .................... 192/45 |
| 2,816,458 | 12/1957 | Castrow . |
| 2,892,522 | 6/1959 | Moo ............................. 192/45 |
| 3,147,595 | 9/1964 | Liang . |
| 3,163,988 | 1/1965 | Gabriel . |
| 3,212,405 | 10/1965 | Smith . |
| 3,229,549 | 1/1966 | Riedl ............................ 74/640 |
| 3,247,727 | 4/1966 | Digby et al. . |
| 3,447,396 | 6/1969 | Seliger ......................... 74/650 |
| 3,557,921 | 1/1971 | Takada ......................... 192/45 |

(List continued on next page.)

FOREIGN PATENT DOCUMENTS

| | | |
|---|---|---|
| 230739 | 10/1960 | Australia . |
| 53-93241 | 8/1978 | Japan . |
| 63-219922 | 9/1988 | Japan . |
| WO8903941 | 5/1989 | PCT Int'l Appl. . |
| 452700 | 3/1973 | U.S.S.R. . |

(List continued on next page.)

Primary Examiner—Rodney H. Bonck
Attorney, Agent, or Firm—Malin, Haley, Dimaggio & Crosby

[57] ABSTRACT

A unidirectional clutch of the hyperboloidal type is provided having an inner race member defining an inner race surface, an outer race member defining an outer race surface and a plurality of thrust transmitting cylindrical rollers therebetween. Each of the rollers makes line contact with the inner race surface and line contact with the outer race surface along generators of these surfaces. A biasing member is provided for biasing the inner and outer race surfaces axially toward one another to maintain the rollers in line contact with both inner and outer race surfaces. The inner race member is connected to a driven member and the outer race member is connected to a driving member. Torque is transmitted between the driven and driving members causing the biasing member to impose a net axial force on the inner race member tending to urge the inner and outer race surfaces toward one another axially.

2 Claims, 4 Drawing Sheets

U.S. PATENT DOCUMENTS

| | | | |
|---|---|---|---|
| 3,779,654 | 12/1973 | Horne | 403/62 |
| 3,790,187 | 2/1974 | Radu et al. | 280/11.2 |
| 3,800,927 | 4/1974 | Takata | 192/45 |
| 3,817,494 | 6/1974 | Eckerdt | 254/187 |
| 3,818,855 | 6/1974 | Shimanckas | 115/34 R |
| 3,874,253 | 4/1975 | Waddington | 74/804 |
| 3,885,544 | 5/1975 | Pfeiffer | 123/179 SE |
| 3,930,341 | 1/1976 | Neuman | 51/89 |
| 3,937,311 | 2/1976 | Gehrke | 192/45 |
| 3,942,616 | 3/1976 | Elmore | 192/45 |
| 3,993,178 | 11/1976 | Mendoza-Orozco | 192/64 |
| 4,022,308 | 5/1977 | Hurst | 192/54 X |
| 4,046,238 | 9/1977 | Mendoza-Orozco | 192/45 |
| 4,159,830 | 7/1979 | Solimine | 280/11.28 |
| 4,181,043 | 1/1980 | Waddington | 74/750 B |
| 4,291,505 | 9/1981 | Taniishi et al. | 51/289 R |
| 4,302,196 | 11/1981 | Blanchard | 440/75 |
| 4,375,739 | 3/1983 | Machida et al. | 51/58 |
| 4,418,947 | 12/1983 | Talafuse | 285/168 |
| 4,441,315 | 4/1984 | Bochot | 60/345 |
| 4,461,375 | 7/1984 | Brown | 192/45 |
| 4,462,490 | 7/1984 | Hattori | 192/0.076 |
| 4,493,316 | 1/1985 | Reed et al. | 128/80 C |
| 4,553,767 | 11/1985 | Robjent et al. | 280/11.21 |
| 4,574,649 | 3/1986 | Seol | 74/138 |
| 4,637,802 | 1/1987 | Taguchi et al. | 440/75 |
| 4,644,828 | 2/1987 | Kazakae | 74/750 B |
| 4,656,789 | 4/1987 | Schwar | 51/105 R |
| 4,683,998 | 8/1987 | Cigdem et al. | 192/54 X |
| 4,693,351 | 9/1987 | Adolfsson | 192/48.92 |
| 4,705,411 | 11/1987 | Kellstrom | 384/450 |
| 4,720,001 | 1/1988 | Jensen | 192/13 R |
| 4,770,279 | 9/1988 | Shiozaki et al. | 192/45 |
| 4,795,474 | 1/1989 | Horvath | 623/27 |
| 4,883,152 | 11/1989 | Fremett | 192/42 |
| 4,907,466 | 3/1990 | Kuhn | 74/378 |
| 4,989,704 | 2/1991 | Morishita et al. | 192/45 |
| 5,024,307 | 6/1991 | Wakabayashi | 192/40 |
| 5,035,309 | 7/1991 | Takada | 192/45 |
| 5,048,635 | 9/1991 | Wakabayashi et al. | 180/247 |
| 5,067,601 | 11/1991 | Castens | 192/65 |

FOREIGN PATENT DOCUMENTS

| | | |
|---|---|---|
| 1254342 | 11/1971 | United Kingdom |
| 1368738 | 1/1974 | United Kingdom |
| 1368739 | 10/1974 | United Kingdom |
| 1550175 | 8/1979 | United Kingdom |
| 190017A | 8/1986 | United Kingdom |
| 312656A | 4/1989 | United Kingdom |

AXIAL THRUST CLUTCH/BEARING/FREEWHEEL

This application is a continuation of application Ser. No. 07/762,585, filed Sep. 19, 1991, which is a continuation-in-part of Ser. No. 07/418,795 filed Oct. 3, 1889, now issued as U.S. Pat. No. 5,067,601 on Nov. 26, 1991, which is a continuation of Ser. No. 07/112,638 filed Oct. 22, 1987, now abandoned, which is a continuation-in-part of Ser. No. 07/016,458 filed Feb. 18, 1987, now abandoned, which is a continuation-in-part of Ser. No. 06/821,453 filed Jan. 22, 1986, now abandoned.

BACKGROUND OF THE INVENTION

1. Field of the Invention

This invention relates to unidirectional couplings and more particularly relates to unidirectional clutches of the hyperboloidal type which incorporate apparatus for eliminating backlash or slippage between the inner and outer races when switching from the freewheeling to the torque transmitting mode.

2. Description of the Prior Art

Various attempts at providing unidirectionally rotatable couplings which do not slip have been made in the past. Among those is a device disclosed in U.S. Pat. No. 5,035,309, issued Jul. 30, 1991 to Takada. Takada teaches a one-way clutch wherein the inner and outer race members are fixed axially with respect to one another but are permitted to rotate with respect to one another. Most notably, Takada suffers from the disadvantage that the inner and outer race members are in frictional contact, and, therefore, substantial energy losses, heat and wear result in virtually all ranges of operation thereof.

Another attempt is set forth in my co-pending U.S. patent application Ser. No. 07/751,865 filed Aug. 28, 1991 currently pending. Although the invention disclosed therein is designed to function commendably, I have devised an alternative to the foregoing which requires a minimum of additional components to accomplish the same task.

SUMMARY OF THE INVENTION

Disclosed herein is a circumferentially self-engaging or self-energizing unidirectional clutch of the hyperboloidal type which comprises a hyperboloidal type clutch/bearing/freewheel coupled to a biasing arrangement which urges the inner and outer race members of said clutch into optimal contact with the rollers of the clutch during both the freewheeling mode and during the torque transmitting mode so that slippage and backlash related phenomena are eliminated.

Generally speaking, a first embodiment of the biasing arrangement is comprised of a first biasing member adapted to transfer torque between a driven or driving element and an inner or outer race member of a hyperboloidal clutch, the biasing member having a series of alternating first raised and lowered areas interconnected by tapered, or sloping, first leading and trailing surfaces between said raised and lowered areas. These first leading and trailing surfaces are engageable by corresponding second raised and lowered areas on said inner or outer race member, said raised and lowered areas being likewise interconnected by tapered or sloping second leading and trailing surfaces.

The biasing member is integrally connected to a driving or a driven member. The interaction of the first tapered leading and trailing surfaces of the biasing member with corresponding second tapering trailing and leading surfaces on the inner or outer race member of the clutch creates a net axial force in the direction of said race member away from said biasing member to bias the inner or outer race member into positive engagement with the rollers so that the rollers are continuously in essentially line contact with both the inner and outer race surfaces.

A second biasing member may also be used to bias the outer or inner race member, in which case both race members will be urged axially toward one another into positive engagement with the rollers.

By "positive" engagement is meant that the inner and outer race surfaces remain essentially in line contact with the thrust transmitting rollers.

By "self engaging" is meant a clutch wherein the natural tendency of the inner and outer clutch race members to separate when the clutch is freewheeling is resisted so that the line contact between the rollers and the inner and outer race surfaces, which occurs when torque is being transmitted from said inner to said outer race member through said rollers, is maintained while said clutch is in the freewheeling state.

Throughout this disclosure, either the inner or outer race member may be connected to either the driving or driven element of a mechanical system being coupled by the self-engaging unidirectional clutch disclosed.

It is an object of the present invention to provide a self-energizing or self-engaging clutch rendered so by the inclusion of a simple biasing member disposed between either the inner or outer race member thereof and a driven or driving member.

It is also an object of the present invention to provide a self-engaging clutch of the hyperboloidal type which is self-contained.

In accordance with these and other objects which will become apparent hereinafter, the instant invention will now be described with particular reference to the accompanying drawings.

DETAILED DESCRIPTION OF THE PREFERRED EMBODIMENT

Figure 1:
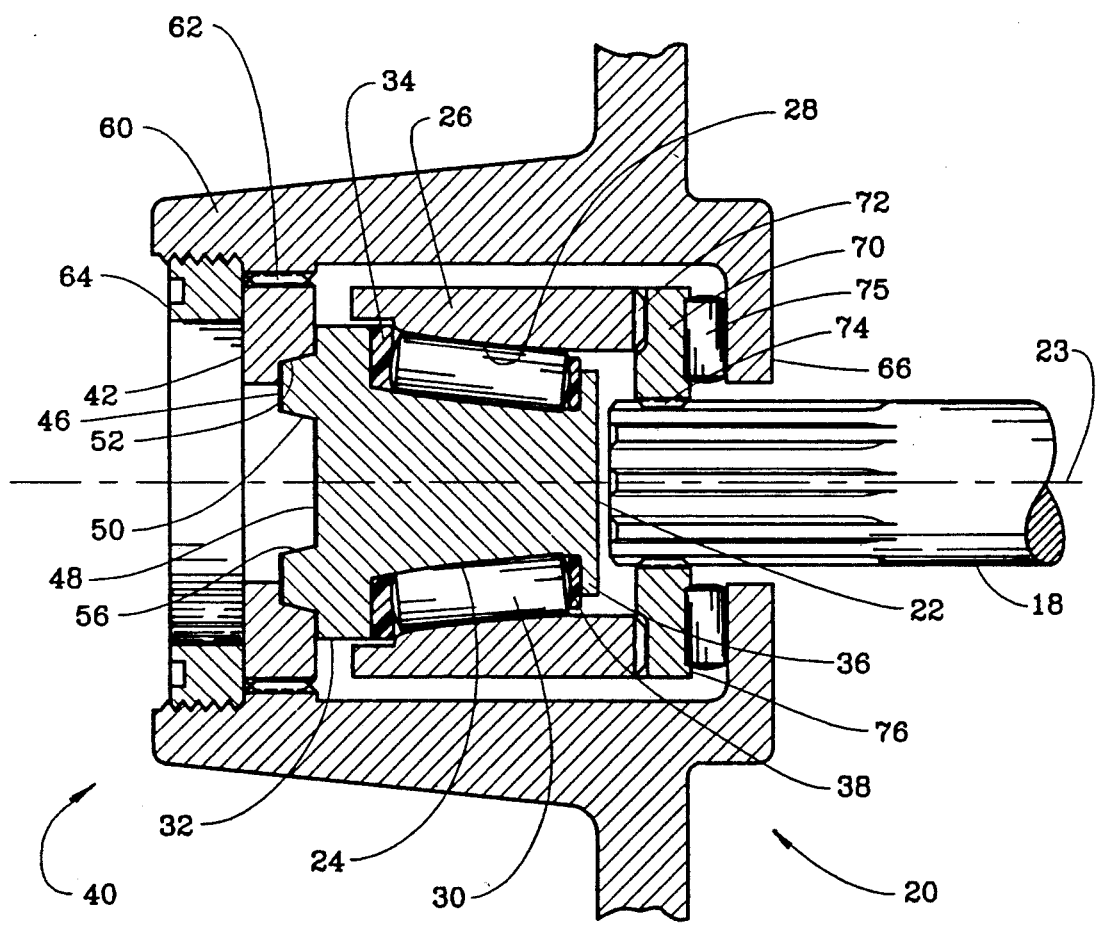
FIG. 1 is a cross-sectional elevational view of a first embodiment of the instant invention.

Referring now to the drawings, FIG. 1 shows a first embodiment of the instant invention which is comprised of a unidirectional clutch of the hyperboloidal type 20 used in combination with an arrangement for biasing 40. Clutch 20 is comprised of an inner race member 22 which defines a subderivative hyperboloidal inner race surface of revolution about the axis of rotation 23 of clutch 20, an outer race member 26 defining a superderivative hyperboloidal outer race surface of revolution 28 about axis 23. Inner and outer race surfaces 26, 28 define an annular volume therebetween in which is disposed a plurality of cylindrical thrust transmitting rollers 30. Rollers 30 make line contact with inner race member 24 along a generator of that surface. Rollers 30 also make line contact with outer race surface 28 along a generator of said outer race surface 28. A first annular shoulder member 32 is integrally connected to inner race member 22 at the first, or large diameter, end of clutch 20, shown to the left in FIG. 1, adapted to support rollers 30 axially thereof. Preferably, an annular ring such as thrust washer 34 may be sandwiched between first ends of rollers 30 and said first annular shoulder 32 to facilitate sliding movement of rollers 30 with respect to shoulder 32 during the freewheeling condition of the clutch. A second annular shoulder 36 is integrally connected to outer race member 26 at the second, or small diameter end, of clutch 20, adapted to support rollers 30 axially thereof at second ends of said rollers. Preferably, an annular member such as thrust washer 38 is disclosed between second ends of rollers 30 and second annular shoulder 36 to facilitate sliding movement of rollers 30 with respect to shoulder 36 in the freewheeling mode.

Clutch 20 is constructed and arranged and operates in accordance with the disclosure set forth in my co-pending U.S. application Ser. No. 07/418,795, which is expressly incorporated by reference herein as through fully set forth herein.

Because of the natural tendency of inner race member 22 to separate from outer race member 26 when said clutch 22 is in the freewheeling or overrun state, due to the tangential frictional forces imposed by rollers 30 on inner and outer race surfaces 24, 28, it is desired to maintain rollers 30 in positive engagement, that is, line contact, with race surfaces 24, 28. To accomplish this, a biasing arrangement 40 is employed which is comprised of a rotatable ring or annular member 42 having a plurality of raised areas 46 and lowered areas 48 thereon, facing shoulder 32 of inner race member 22, connected by leading surfaces 52 and trailing surfaces 54. Surfaces 52, 54 are sloping and engage corresponding sloping surfaces 50, 56 of first annular shoulder 32 of inner race member 22.

Figure 4:
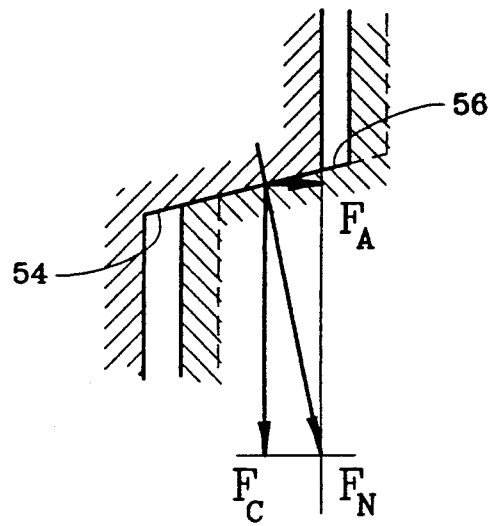
FIG. 4 is a detailed view of the interconnection between a leading or trailing surface of the ring member and a trailing or leading surface of the inner or outer race member of the clutch.

As seen in FIG. 4, because of the sloping, tapered, nature of surfaces 50, 52, 54 and 56, the normal force exerted by surface 54 on 56, or vice versa, results in an axial component of force $F_a$ directed toward inner race member 22, which biases inner race member 22 axially toward outer race member 26.

Member 42 is connected for rotation to machine element 60 as via teeth or splines 62 and retained against axial movement away from inner race member 22 by snap-on or threadingly connected retaining element 64. Machine element 60 has a collar 66 which is associated with outer race member 26 for rotation via tapered rollers 75.

Torque is transmitted from machine element 60 through element 42, inner race member 22, rollers 30 and outer race member 26, and then through second annular ring 70 and to shaft 18. Second annular ring member 70 is connected for rotation to shaft 18 as via teeth or splines 74 and has a bearing surface 76 over which rollers 75 pass. Second ring 70 may be connected to outer race member 26 with teeth or splines 72, or alternatively, may be connected with tapered surfaces similar to 52, 54 of first ring 42 to provide an axial bias force similar to $F_A$, but in this situation, acting against outer race member 26.

Figure 3:
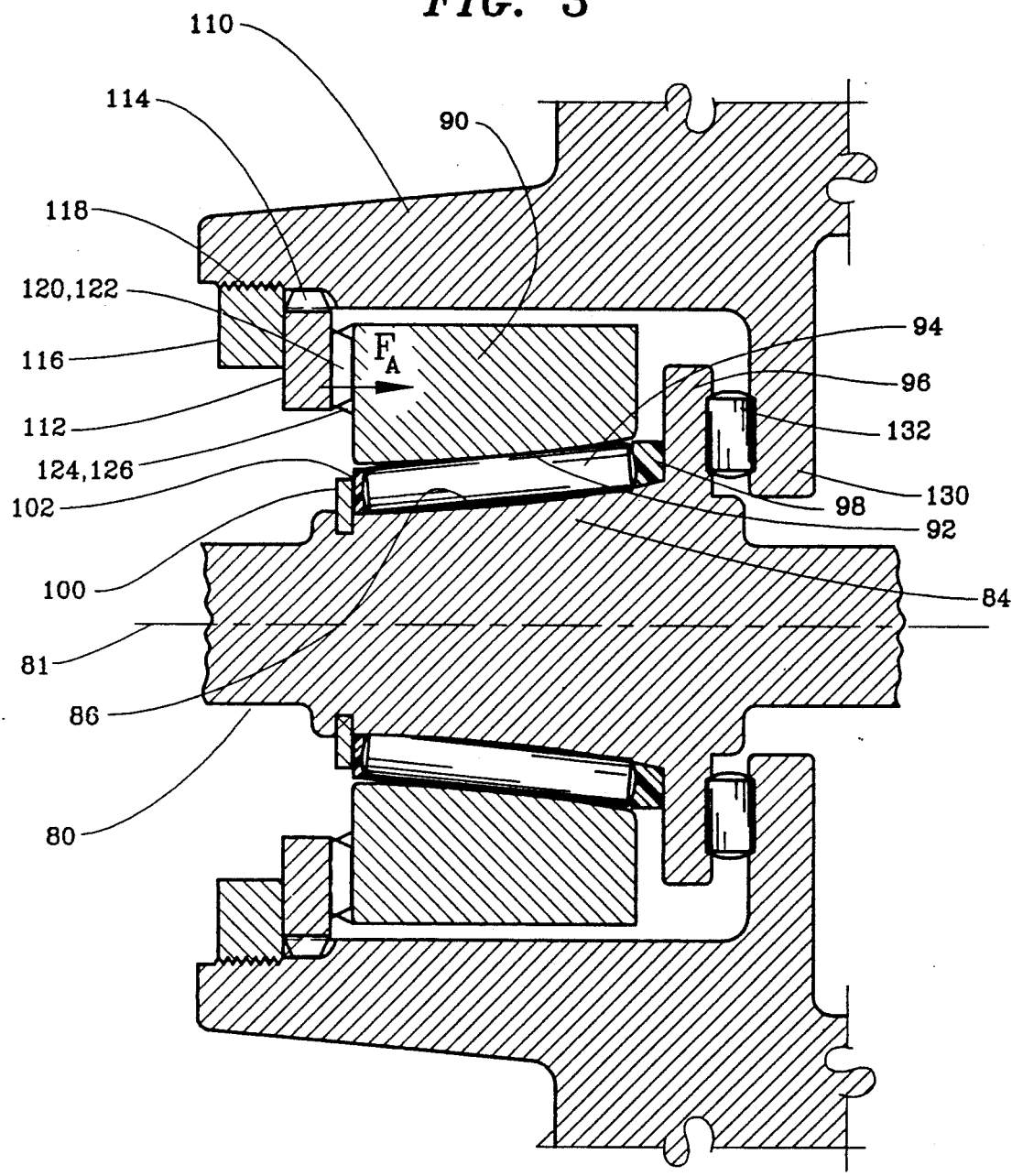
FIG. 3 is a cross-sectional elevational view of a second embodiment of the instant invention.

FIG. 3 shows a second embodiment of the instant invention which is comprised of a rotatable machine element such as a shaft 80 rotatable about an axis of revolution 81. Shaft 80 has connected to or machined out of itself an inner race member 84 which defines a subderivative hyperboloidal inner race surface of revolution 86 about axis 81. Disposed generally concentrically about inner race 84 is an outer race member 90 defining a superderivative hyperboloidal outer race surface of revolution 92 about axis 81. Surfaces 86, 92 define an annular volume therebetween in which are disposed a plurality of thrust transmitting cylindrical rollers 94 which make line contact with both inner race surface 86 and outer race surface 92 along generators of those surfaces, respectively. Rollers 94 are supported axially by shoulder 96 of inner race member 84. Said shoulder may be provided, in the alternative, connected to outer race member 90. A thrust washer such as 98 may be employed between first ends of rollers 94 and shoulder 96 to facilitate sliding movement of said rollers 94 with respect to shoulder 96 in the freewheeling mode of the clutch. Furthermore, a second annular shoulder such as retainer 100 may be employed at the smaller, or second end, of the clutch and a second annular thrust washer 102 used to support rollers 94 axially thereof and to facilitate sliding movement of said rollers with respect to retainer 100 in the freewheeling mode.

Clutch 22 is adapted to transmit torque between shaft 80 and machine element 110 with respect to attempted relative rotation of member 110 with respect to shaft 80 in one direction but to permit freewheeling, or overrunning thereof, with respect to relative rotation of members 80, 110 in the opposite direction.

Figure 2:
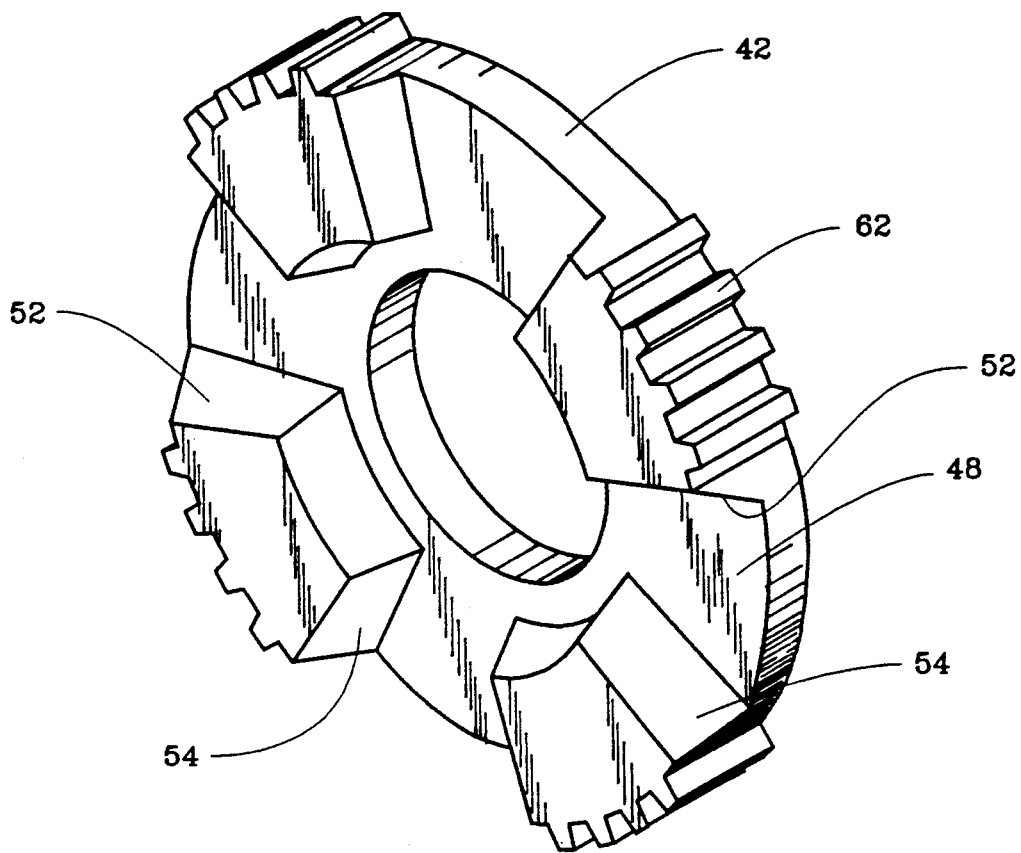
FIG. 2 is a perspective view of the ring member used in accordance with the invention of FIG. 1.

A second biasing arrangement is disclosed in FIG. 3 and is comprised of an annular ring member 112 connected for rotation with member 110 through splines or teeth 114. Retaining member 116 is rigidly, but removably connected to member 110 as via threads 118 and retains ring member, and hence inner race member 112, and hence outer race member 90, against axial movement to the left in FIG. 3. Ring member 112 is provided with a series of raised and lowered areas in the manner shown in FIG. 2 and with tapered trailing and leading surfaces 120, 122 adapted to mesh with corresponding tapered surfaces 124, 126 projecting from outer race member 90. The net effect of the foregoing is shown in FIG. 4 as to the first embodiment of this invention, which shows a net axial force $F_A$ directed from ring member 112 toward outer race member 90 as a result of the contact between surfaces 120 and 124 for one direction of relative rotation of member 110 with shaft 80 or surfaces 122 and 126 for relative rotation of member 110 with shaft 80 in the opposite direction. Member 110 is provided with an annular support shoulder 130 disposed opposite annular shoulder 96 of inner race member 84. A plurality of tapered rollers 132 are provided in the space between shoulders 96 and 130 to permit sliding, rotational, movement of member 110 with respect to inner race member 84 yet resisting the axial load $F_A$ created by surfaces 120, 122, 124 and 126.

Figure 5:
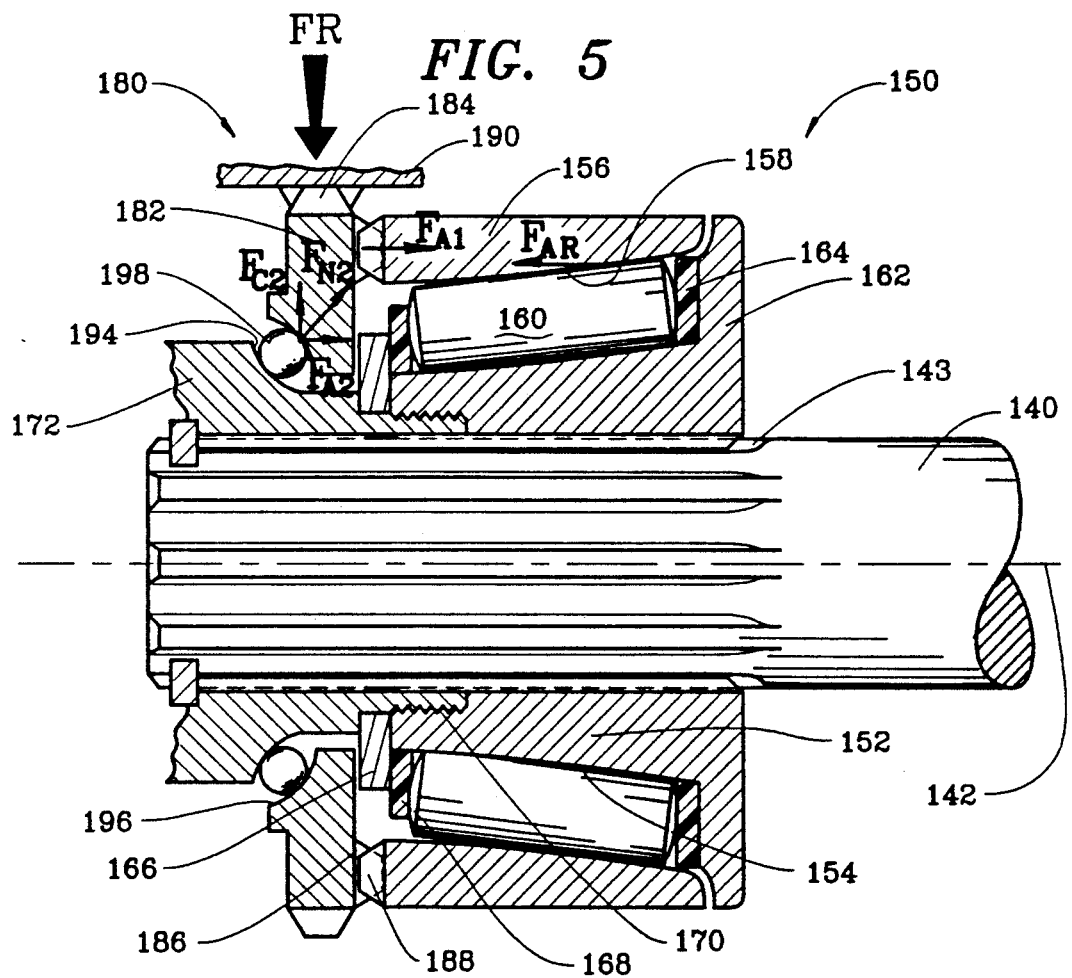
FIG. 5 is a cross-sectional elevational view of a third embodiment of the instant invention.

The third embodiment of the instant invention is shown in FIG. 5 and is comprised of a machine element such as shaft 140 rotatable about axis of rotation 142. Shaft 140 is provided with splines 143 or other engagement means for connection thereof to an inner race member 152 of a hyperboloidal clutch of the unidirectional type 150. Inner race member 152 defines a subderivative hyperboloidal inner race surface of revolution 154 about axis 142. Clutch 150 also includes an outer race member 156 defining a superderivative hyperboloidal outer race surface of revolution 158 about axis 142. Surfaces 154, 158 are disposed in confronting relationship and define an annular volume therebetween in which is disclosed a plurality of thrust transmitting cylindrical rollers 160, all said rollers being similarly inclined with respect to radial planes and each roller making line contact with inner race surface 154 along a generator of that surface, rollers 160 also each making line contact with outer race surface 158 along generators of outer race surface 158. Inner race member 152 is provided with an annular shoulder 162 at the first, or large diameter, end of clutch 150, shoulder 162 acting to support rollers 160 axially thereof. An annular thrust washer 164 may be employed at the interface of first ends of rollers 160 and shoulder 162 to facilitate sliding movement of rollers 160 with respect to shoulder 162 when clutch 150 is freewheeling. Likewise, a second shoulder member such as retaining member 166 may be employed, connected to either inner or outer race members 152, 156, respectively at the second, or small diameter end of clutch 150, to support the rollers axially thereof opposite shoulder 162. A second annular thrust washer 168 may be employed between second ends of rollers 160 and retaining member 166 to facilitate sliding movement of rollers 160 with respect to member 166. For ease of assembly, inner race member may be connectable via threads 170 to a secondary element 172.

In order to maintain inner and outer race members 154, 158 in positive engagement with rollers 160, a biasing arrangement 180 is desired, comprised of a rotatable ring member 182 adapted to transmit torque between outer race member 156 and a machine element 190 through splines 184 and projections 186 of ring member 182 and corresponding projections 188 of outer race member 156. Projections 186, 188 function in accordance with raised and lowered areas 46, 48 of ring member 42 of FIG. 2. That is, a net axial force $F2_{A1}$ of outer race member 156 to maintain rollers 160 in positive engagement with surfaces 154, 158.

In addition, or alternatively to projections 186, 188, a ball bearing arrangement may be provided to generate an axial force $F_{A2}$ by ring 182 on outer race member 156. Ball bearing arrangement is comprised of inner ball bearing race surfaces 194 formed in element 172, an outer ball bearing race surface 196 formed in ring 182, and a plurality of spherical ball members 198. It can be seen that a radially directed force $F_R$ imposed on ring 182 will give rise to a counteracting normal force between balls 198 and surfaces 194, 196 of magnitude $F_{N2}$. Force $F_{N2}$ has a component $F_{A2}$ which is an axially directed force in the direction of outer race member 156, which acts to maintain rollers 160 in positive engagement with surfaces 154, 158.

Because of the frictional forces generated between rollers 160 and inner and outer race members 152, 156, respectively, tend to urge outer race member 156 to the left and inner race member 152 to the right in FIG. 5, the net magnitude of forces $F_{A1}$ and $F_{a2}$ must exceed the magnitude of $F_{AR}$. Likewise, for the first and second embodiments, the magnitude of axial force $F_A$ must exceed the force exerted on the outer race member 26 or 90 in order for the biasing arrangement to function properly.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. In a unidirectional clutch of the hyperboloidal type having an inner race member, an outer race member, a plurality of thrust transmitting cylindrical rollers, each said roller making line contact with an inner race surface and line contact with an outer race surface along generators of said inner and outer race surfaces, respectively, the improvement comprising means for biasing said inner and outer race surfaces axially toward one another to maintain said rollers in line contact with both said inner and outer race surfaces, said inner race member being connected to a driven member, said outer race member being connected to a driving member, wherein torque transmitted between said driven and said driving members causes said means for biasing to impose a net axial force on said inner race member tending to urge said inner and outer race surfaces toward one another axially.

2. The clutch of claim 1, wherein said means for biasing is comprised of a circular member connected for rotation to said driven member, said circular member having a series of alternating raised and lowered areas, each raised area being separated from lowered areas on either side thereof by a tapering leading or trailing surface; a series of lowered and raised areas defined by said inner race member adapted to intermesh with said series of raised and lowered areas of said circular member, said lowered and raised areas of said inner race member being separated one from the other by a tapered trailing or leading surface, said trailing or leading surfaces of said inner race member adapted to make planar contact with said leading or trailing surfaces of said circular member so that when torque is transferred from said circular member to said inner race member, or vice versa, through said planar faces, said inner race member is biased axially in the direction of the outer race member.

* * * * *